United States Patent Office 3,458,888
Patented Aug. 5, 1969

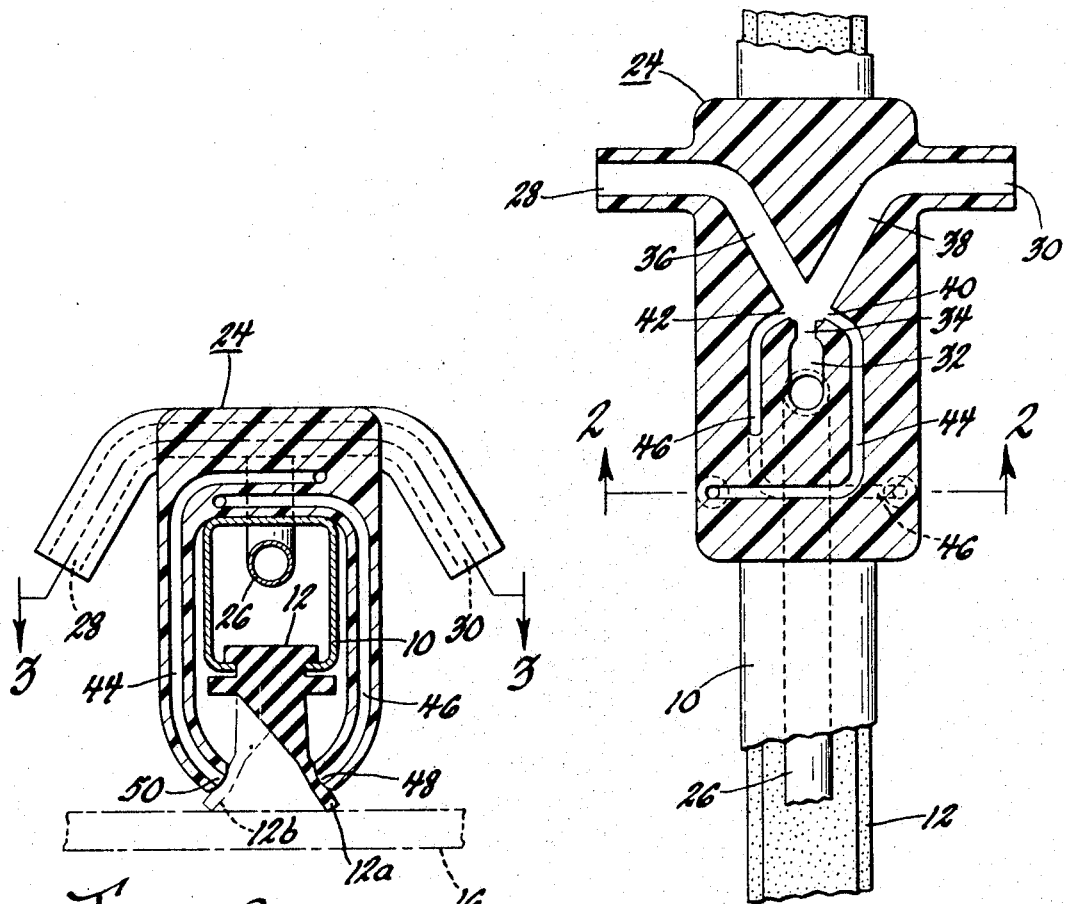
Fig. 2
Fig. 3
Fig. 1
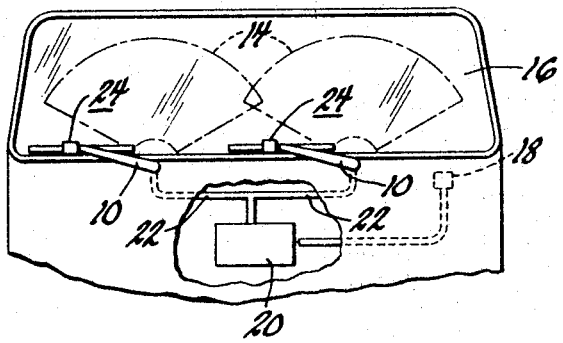

3,458,888
WINDSHIELD WASHER ARM
Keith H. Carpenter, Kettering, Ohio, assignor to General Motors Corporation, Detroit, Mich., a corporation of Delaware
Filed Dec. 15, 1965, Ser. No. 514,009
Int. Cl. B60s *1/04, 1/46;* F15c *1/08*
U.S. Cl. 15—250.04                                5 Claims

ABSTRACT OF THE DISCLOSURE

This disclosure relates to a windshield cleaning system having a wiper blade carried by a wiper arm for wiping the windshield when moved in opposite directions thereacross and in which the wiper blade is deflectable in opposite directions about its longitudinal axis between first and second positions, the wiper blade deflecting between these positions upon reversal of movement of the wiper arm and with the wiper blade deflecting in a direction opposite to the direction in which it is being moved after reversal. The windshield cleaning system further includes a dispensing means carried by the wiper arm and having outlets for directing fluid from either side of the wiper arm. The dispensing means includes a fluid amplifier means operable automatically in response to deflecting movement of the wiper blade about its longitudinal axis upon reversal of movement of the wiper arm for causing the cleaning fluid to be emitted only through the outlet which directs the same in front of the direction of movement of the wiper blade.

---

This invention relates to windshield washing mechanisms and more particularly to a dual outlet nozzle carried on a windshield wiper arm.

When utilizing mechanism to wash a vehicle windshield, it is desirous to place a cleaning fluid on the windshield from a point located as close thereto as possible and also to place the cleaning fluid in front of an advancing wiper blade to maximize cleaning efficiency. It is also desirable to place a cleaning fluid on a windshield on either side of a blade depending on which direction the blade is sweeping so that washing takes place every half cycle rather than only once every complete cycle. The type system proposed herein most efficiently utilizes the cleaning fluid in that the appropriate nozzle located on the side of the blade advancing during a wiping action is selectively provided with a cleaning fluid resulting in minimum loss of cleaning fluid and constant blade lubrication.

It is an object of the present invention to provide an improved fluid dispensing nozzle that selectively dispenses fluid to opposite sides of a windshield wiper blade.

It is another object of the present invention to provide an improved fluid dispensing nozzle incorporating a fluid amplifier which selectively directs dispensed fluid to an advancing side of a windshield wiper blade.

It is still another object of the present invention to provide an improved fluid dispensing nozzle carried by a wiper arm and which responds to deflection of a windshield wiper blade to dispense a cleaning fluid on the side of the wiper blade advancing during a wiping action.

Further objects and advantages of the present invention will be apparent from the following description, reference being had to the accompanying drawings wherein a preferred embodiment of the present invention is clearly shown.

In the drawings:

FIGURE 1 illustrates the subject invention in its operative environment;

FIGURE 2 is a sectional view of the subject invention taken along line 2—2 of FIGURE 3;

FIGURE 3 is a sectional view of the subject invention taken along line 3—3 of FIGURE 2.

Referring to FIGURE 1, windshield wiper arms 10 carrying blades 12 are powered in any well-known manner to oscillate from the position shown in FIGURE 1 which is a parked position through patterns 14 shown on windshield 16. It is understood that the wiper arm 10 moves within the confines of patterns 14 during the operative sweep across the windshield and moves into the position shown in FIGURE 1 by use of a parking mechanism incorporated into the windshield wiper system not described herein.

The subject windshield wiping system includes a windshield washing system functioning therewith that consists of a control 18 operatively positioned in the driving compartment of the vehicle, a combination pump and reservoir 20 supplying cleaning fluid under pressure to lines 22, and nozzles, generally designated by the numeral 24, carried by wiper arms 10 and being in fluid communication with lines 22 through lines 26 formed within arms 10. The relationship of line 26 to arm 10 is better seen in FIGURE 2.

Referring to FIGURE 2, nozzle 24 is shown operatively carried on arm 10 and includes outlets 28 and 30 directed toward windshield 16 and respectively dispensing fluid toward windshield 16 on either side of blade 12.

Referring to FIGURE 3, line 26 is shown as terminating in passage 32 having a restriction or venturi 34 which directs fluid into either passage 36 or passage 38 terminating in outlets 28 and 30 respectively. Control ports 40 and 42 are the termini of passages 44 and 46 respectively which include openings 48 and 50 respectively. As seen in FIGURE 2, openings 48 and 50 are alternately closed off by a deflected wiper blade 12 as it moves across windshield 16. Also seen in FIGURE 2 is the fact that, when wiper blade 12, as illustrated by the solid lines 12a, closes opening 48, the wiper blade is advancing in a direction toward opening 50 and nozzle 28. When the wiper blade 12 is deflected as shown by the dotted lines 12b, opening 50 is blocked by the wiper blade and the windshield wiper is advancing in the direction of opening 48 and nozzle 30.

In operation, the windshield washing system is actuated either in conjunction with the windshield wiping mechanism or after the windshield wiping mechanism is already in operation. Therefore, wiper blade 12 alternately deflects between positions 12a and 12b as the wiper arm reaches the extremities of pattern 14. It should be noted that the wiper blade deflects away from the direction of the wiping as the wiper moves through the wiping pattern. As previously stated, it is desirable to selectively direct the dispensed fluid in front of the advancing wiper blade to effect the most efficient wiping.

It is presumed for purposes of this explanation that the windshield wiping blades 12 are forming the patterns 14, as seen in FIGURE 1, before the fluid is dispensed initially. Control 18 begins the dispensing of fluid from reservoid 20 and pressurizes lines 22 in any well-known manner. Therefore, fluid under pressure enters line 26 and passage 32. Nozzle 24 is a fluid amplifier and, due to the Coanda effect, is directed either into passages 36 or 38 and attaches to the walls of said passages near the area where the ports 40 and 42 are disposed. It is well-known that a low pressure area exists normally near the point of attachment in a fluid amplifier and as long as the pressure in this area is not raised the fluid stream will maintain attachment in that area.

Assuming that, when the fluid under pressure enters passage 32, it flows into passage 38 and through outlet 30, a low pressure area is established near port 40. Port 40 communicates through passage 44 with opening 50. If the blade is moving in a manner causing deflection to position 12b, opening 50 is blocked resulting in a maintaining of the low pressure area at port 40. Therefore, the fluid stream emanating from outlet 30 will continue because, as previously stated, the dispensing of fluid should be from outlet 30 when the blade assumes position 12b in order to maximize cleaning efficiency.

When arm 10 reaches the end of its travel in the wiping pattern and begins the return movement, blade 12 will flip from position 12b to position 12a, thereby blocking opening 48 and bringing opening 50 and passage 44 into communication with the atmosphere. Referring to FIGURE 3, it is seen that, with the opening of 50 to the atmosphere, the point of attachment near port 40 communicates with the atmosphere destroying the low pressure area near the point of attachment by venting atmospheric air thereto. When this occurs, the fluid stream emanating from venturi 34 will shift to passage 36 attaching to the wall of passage 36 near port 42. As seen in FIGURE 3, port 42 communicates through passage 46 with opening 48. With blade 12 in position 12a, opening 48 is blocked, resulting in a maintaining of the low pressure area at the point of attachment near port 42. Therefore, the stream of fluid will be dispensed at outlet 28 and directed at the windshield 16 in the advancing direction of blade 12.

As the cycle continues and arm 10 reaches the opposite extremity of movement in pattern 14, the blade 12 will flip from position 12a to position 12b reversing the cycle previously described, causing a return to the dispensing of fluid from outlet 30. This reversing of fluid flow alternately from outlets 28 and 30 will continue in the manner described as long as the wiper moves across the windshield in the predetermined manner forming patterns 14. When the windshield wiper is turned off, the wiper arm 10 will assume the parked position illustrated in FIGURE 1 and the washer control 18 is actuated either manually or automatically to discontinue the flow of fluid under pressure through lines 22.

The subject invention provides a very effective method of alternating the flow of windshield washing fluid to the proper side of the wiper blade as the blade forms the wiping pattern without the use of any internal moving parts by use of a fluid amplifier. The normal tilting of the wiper blade at the extremes of a wiping pattern is utilized to gain the unexpected result of a shifting of a stream of washing fluid to the side of a blade giving the most efficient cleaning action. The apparatus disclosed is not subject to maintenance problems because of the lack of moving parts, it is very simple and economical to manufacture, and dispenses fluid at the nearest possible point to the windshield resulting in maximum efficiency of operation.

While the embodiment of the present invention, as herein disclosed, constitutes a preferred form, it is to be understood that other forms might be adopted.

What is claimed is as follows:

1. A windshield cleaning system comprising: a wiper arm which is adapted to be moved in opposite directions across the windshield, a wiper blade carried by the wiper arm for wiping the windshield and which is deflectable in opposite directions about its longitudinal axis between first and second positions, said wiper blade being deflected between said positions upon reversal of movement of said wiper arm and in a direction opposite the direction in which it is being moved across the windshield by the wiper arm after reversal, a fluid dispensing means carried by the wiper arm and having outlets for directing cleaning fluid onto the windshield from either of the opposite sides of said wiper arm, a source of cleaning fluid, means selectively operable to supply cleaning fluid under pressure from said source to said dispensing means, said dispensing means including a control means engageable with said wiper blade and operable automatically in response to deflecting movement of said wiper blade about its longitudinal axis between said first and second positions upon reversal of movement of said wiper arm for causing said cleaning fluid to be emitted only through the outlet which directs the same in front of the direction of movement of the wiper blade as the latter is moved across the windshield by the wiper arm.

2. A windshield cleaning system as defined in claim 1 wherein said control means is a fluid amplifier having an inlet passageway and first and second outlet passageways respectively in communication with said outlets on the opposite sides of said wiper arm, said fluid amplifier also including first and second opposed control ports which are in communication with the atmosphere adjacent the opposite lateral sides of the wiper blade, said wiper blade when deflected about its longitudinal axis between its first and second positions blocking communication between the atmosphere and one of said control ports and establishing communication between the other control port and the atmosphere to effect a switching of fluid flow from one outlet passageway to the other.

3. In combination, a windshield wiper comprising a wiper arm which is adapted to be moved in opposite directions across the windshield, a wiper blade carried by said wiper arm for wiping the windshield and a windshield washer comprising a fluid dispensing means carried by the wiper arm and which is operable to dispense washing fluid toward the windshield in front of the direction of movement of the wiper blade, said dispensing means including a fluid amplifier having an inlet passageway to which washing fluid under pressure is adapted to be supplied and a pair of outlet passageways in communication with said inlet passageway and which terminate in outlets respectively disposed on opposite sides of said wiper arm, said fluid dispensing means further including control means operatively connected with said fluid amplifier for selectively switching the flow of washing fluid from one outlet passageway to the other outlet passageway when a reversal of movement of said wiper blade takes place so that the washing fluid is only dispensed in front of the direction of movement of said wiper blade.

4. The combination as defined in claim 3 wherein said means for switching said washing fluid includes a pair of opposed control ports disposed transversely of the direction of flow of washing fluid through the fluid amplifier and which are respectively in communication with the atmosphere at locations adjacent the opposite lateral sides of the wiper blade, and wherein said wiper blade is deflectable in opposite directions relative to said wiper arm and is deflected upon reversal of movement of the wiper arm in a direction opposite the direction of movement of the wiper arm after reversal, said wiper blade when being deflected upon reversal of movement of the wiper arm blocking communication between the atmosphere and the port previously in communication with the atmosphere immediately prior to said reversal of movement and establishing communication between the atmosphere and the port previously blocked immediately prior to said reversal of movement to create a higher pressure at the latter port and effect a shifting of the washing fluid from one passageway to the other outlet passageway so that fluid is dispensed only in front of the direction of movement of the wiper blade.

5. The combination as defined in claim 4 wherein said dispensing means comprises a one-piece member.

References Cited
UNITED STATES PATENTS

| | | | |
|---|---|---|---|
| 2,632,911 | 3/1953 | Deibel | 15—250.04 |
| 2,763,023 | 9/1956 | Horton | 15—250.04 |
| 3,008,171 | 11/1961 | Kelley et al. | 15—250.04 |
| 3,124,999 | 3/1964 | Woodward | 137—81.5 XR |
| 3,143,753 | 8/1964 | Torely | 15—250.04 |

WALTER A. SCHEEL, Primary Examiner

R. I. SMITH, Assistant Examiner

U.S. Cl. X.R.

137—81